United States Patent [19]
Fujii

[11] Patent Number: 6,149,176
[45] Date of Patent: Nov. 21, 2000

[54] BICYCLE SHOCK ABSORBER WITH MULTILAYERED SHOCK ABSORBING MEMBERS

[75] Inventor: Kazuhiro Fujii, Kawachinagano, Japan

[73] Assignee: Shimano, Inc., Osaka, Japan

[21] Appl. No.: 09/309,169

[22] Filed: May 10, 1999

[30] Foreign Application Priority Data

May 11, 1998 [JP] Japan .................................. 10-127890

[51] Int. Cl.[7] ........................................................ B62K 3/00
[52] U.S. Cl. ........................... 280/284; 280/259; 192/209; 74/594.1
[58] Field of Search ................................... 280/259, 284; 74/594.1; 192/209; 464/73, 74, 76, 82, 89, 903; 267/140.3, 140.5, 150

[56] References Cited

U.S. PATENT DOCUMENTS

| | | | |
|---|---|---|---|
| 3,645,114 | 2/1972 | Shepherd | 64/14 |
| 4,328,879 | 5/1982 | Tone | 180/219 |
| 4,380,442 | 4/1983 | Amsel | 464/93 |
| 4,543,075 | 9/1985 | Colford | 464/76 |
| 5,050,446 | 9/1991 | Takashima et al. | 74/574 |
| 5,507,477 | 4/1996 | Manning et al. | 267/140.3 |
| 5,924,928 | 7/1999 | Stegman et al. | 464/73 |
| 5,931,052 | 8/1999 | Zhao et al. | 74/574 |
| 5,997,022 | 12/1999 | Matsui | 280/284 |

FOREIGN PATENT DOCUMENTS

| | | |
|---|---|---|
| 4233596 A1 | 4/1994 | Germany . |
| 9-290790 | 11/1997 | Japan . |

OTHER PUBLICATIONS

U.S. patent application, Ser. No. 08/887,306, filed Jul. 2, 1997.

*Primary Examiner*—Brian L. Johnson
*Assistant Examiner*—Daniel Yeagley
*Attorney, Agent, or Firm*—James A. Deland

[57] ABSTRACT

A shock absorbing member includes a first elastic body and a second elastic body at least partially overlapping the first elastic body in a rotational direction of a first member and the second member. An elasticity of the first elastic body is different from an elasticity of the second elastic body.

24 Claims, 12 Drawing Sheets

BICYCLE SHOCK ABSORBER WITH MULTILAYERED SHOCK ABSORBING MEMBERS

BACKGROUND OF THE INVENTION

The present invention is directed to bicycle components and, more particularly, to a bicycle shock absorber wherein the shock absorber elements are formed as multilayered structures.

Cycling grows in popularity not only as a transportation means but, to a greater extent, as a mode of recreation. In addition, cycling is a popular competitive sport for professionals and amateurs. It is known that mountain and road bicycles are currently provided with front or rear suspensions to absorb shocks transmitted to the rider both on and off the road. Numerous structures, ranging from simple to complex, are used for such suspensions. For example, Japanese Unexamined Patent Application 9-290790 teaches an inexpensive bicycle suspension with a simple structure. This suspension comprises a cylindrical external member with a plurality of projections extending inwardly and an internal member mounted inside the external member and having a plurality of projections extending radially outwardly, wherein the plurality of projections extending from the external member radially face the plurality of projections extending from the internal member. Elastic members are mounted between the external member and the internal member and are compressionally deformed by the relative rotation of the two members. The external and internal members may be integrally linked to respective front and rear frame members of the bicycle, wherein the rear frame member is fixed to the side plates. Thus, the shocks acting on the rear frame from the road surface due to road irregularities or differences in level are absorbed by the elastic members.

The elasticity of the elastic members, which are made of urethane rubber or other elastic bodies, determines the suspension characteristics. Enhancing the elasticity of the elastic members, for example, yields soft suspension characteristics and allows mild shocks caused by fine irregularities to be absorbed. However, such elastic members cannot effectively absorb large shocks, thus resulting in "bottoming out" of the shock absorbing device and causing harsh shocks to be transmitted to the rider. Conversely, lowering the elasticity of the elastic members results in harder suspension characteristics. While such elastic members soften the blow of large shocks, they fail to absorb milder shocks. As a result, it is difficult to construct a shock absorbing device that can absorb both sever and mild shocks.

SUMMARY OF THE INVENTION

The present invention is directed to a bicycle shock absorber of the type having a second member coupled to a first member for relative rotation between the two, wherein elastic members disposed between the first and second members can absorb both mild and severe shocks. More specifically, the present invention is directed to a shock absorbing member used in a shock absorber for mounting between a first frame member and a second frame member of a bicycle, wherein the shock absorber includes a first member adapted to couple to the first frame member, a second member adapted to couple to the second frame member, and a coupling mechanism coupling the first member with the second member so that the first member rotates relative to the second member. The shock absorbing member includes a first elastic body and a second elastic body at least partially overlapping the first elastic body in a rotational direction of the first member and the second member. An elasticity of the first elastic body is different from an elasticity of the second elastic body.

In a more specific embodiment, the first elastic body may be immovably fixed to the second elastic body such as by bonding, wherein one the first elastic body has a protrusion that engages a groove in the second elastic body, or wherein the first elastic body surrounds the second elastic body. In another specific embodiment, a third elastic body at least partially overlaps the second elastic body in a rotational direction of the first member and the second member, wherein an elasticity of the third elastic body is different from the elasticity of the first elastic body and/or the second elastic body.

DETAILED DESCRIPTION OF THE EMBODIMENTS

Figure 1:
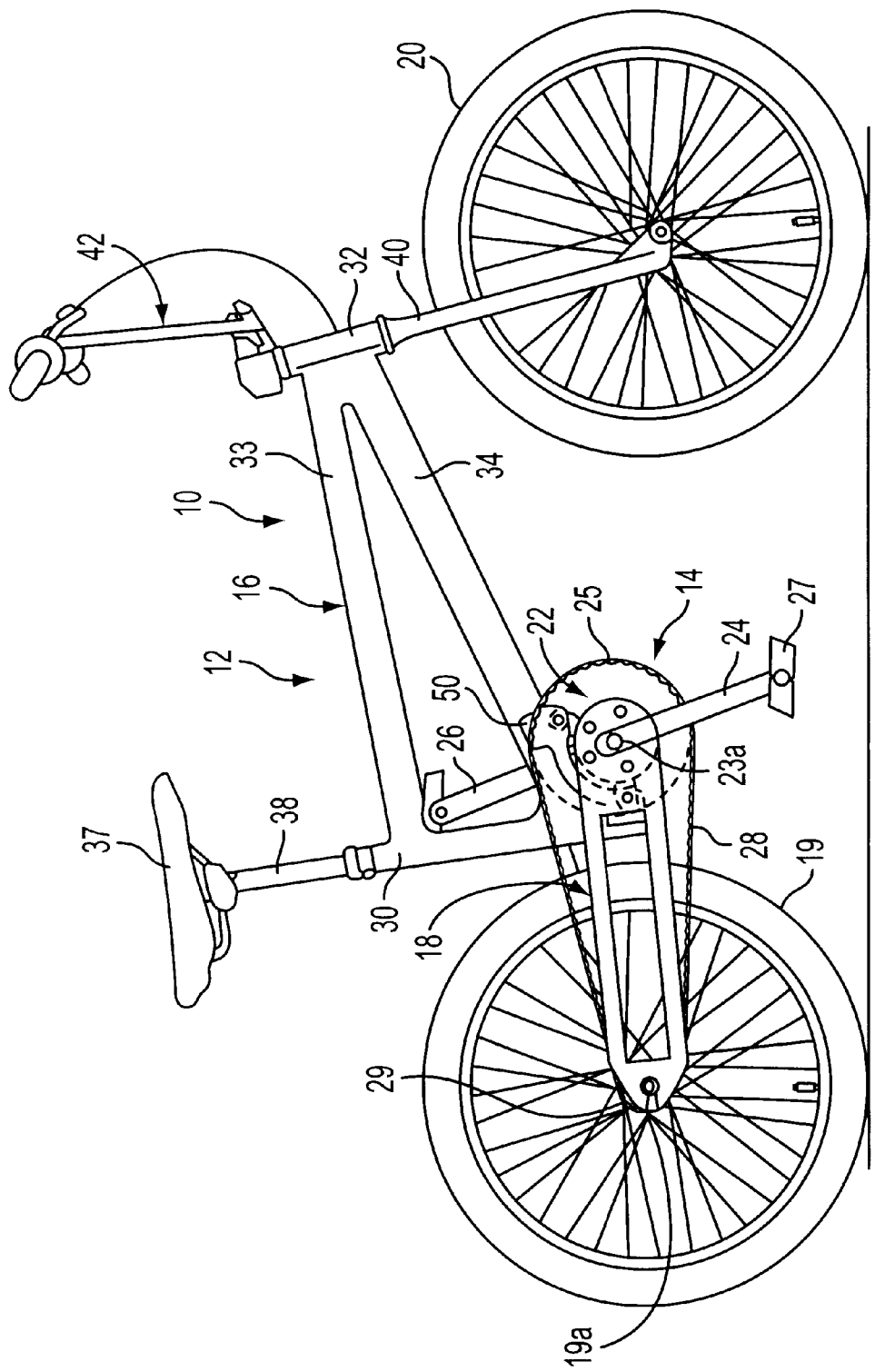
FIG. 1 is a side view of a bicycle that includes a particular embodiment of a shock absorber according to the present invention.
Figure 2:
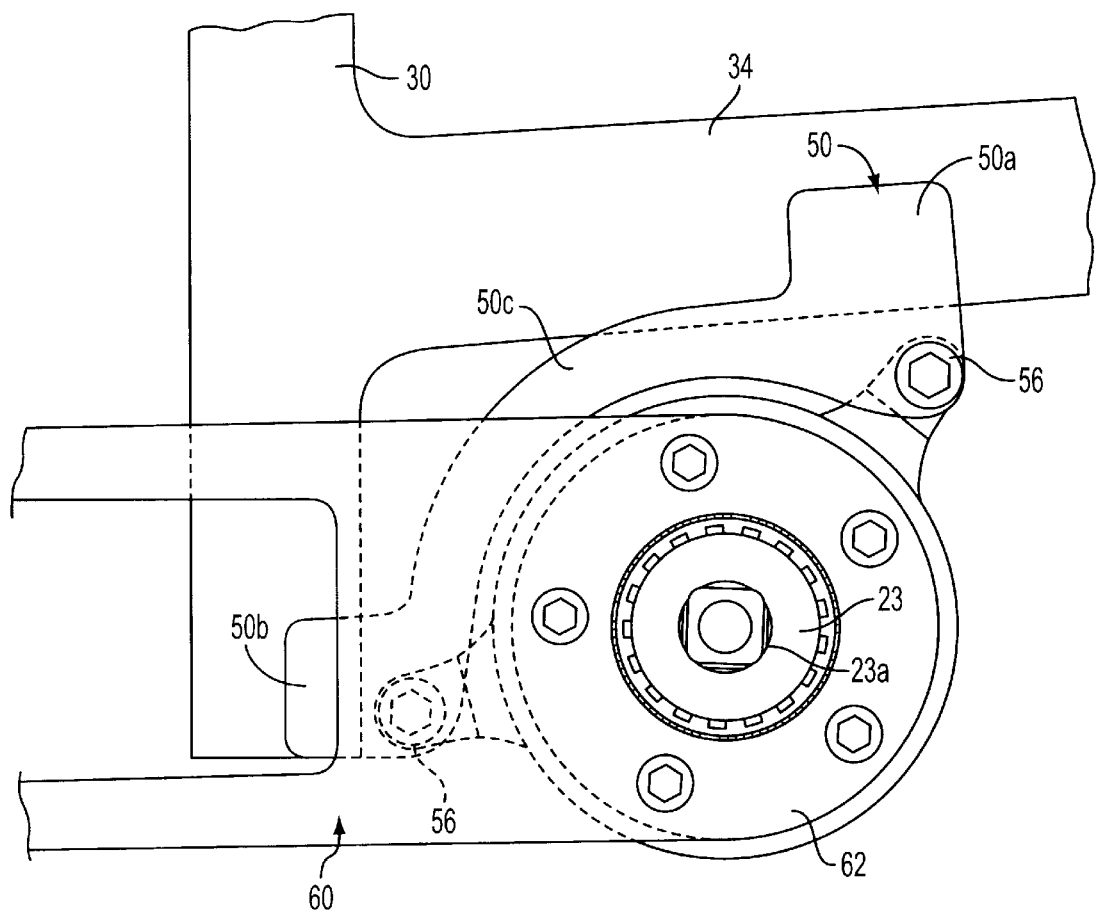
FIG. 2 is a more detailed view of the pedal drive area of the bicycle shown in FIG. 1.

In FIGS. 1 and 2, the bicycle 10 in which an embodiment of the present invention is employed is a BMX-type bicycle provided with a frame 12 and a suspension assembly 14. The frame 12 primarily has a main frame member (an example of a first frame member) 16 and a rear frame member (an example of a second frame member) 18 elastically linked to the main frame member 16 via the suspension assembly 14.

Figure 3:
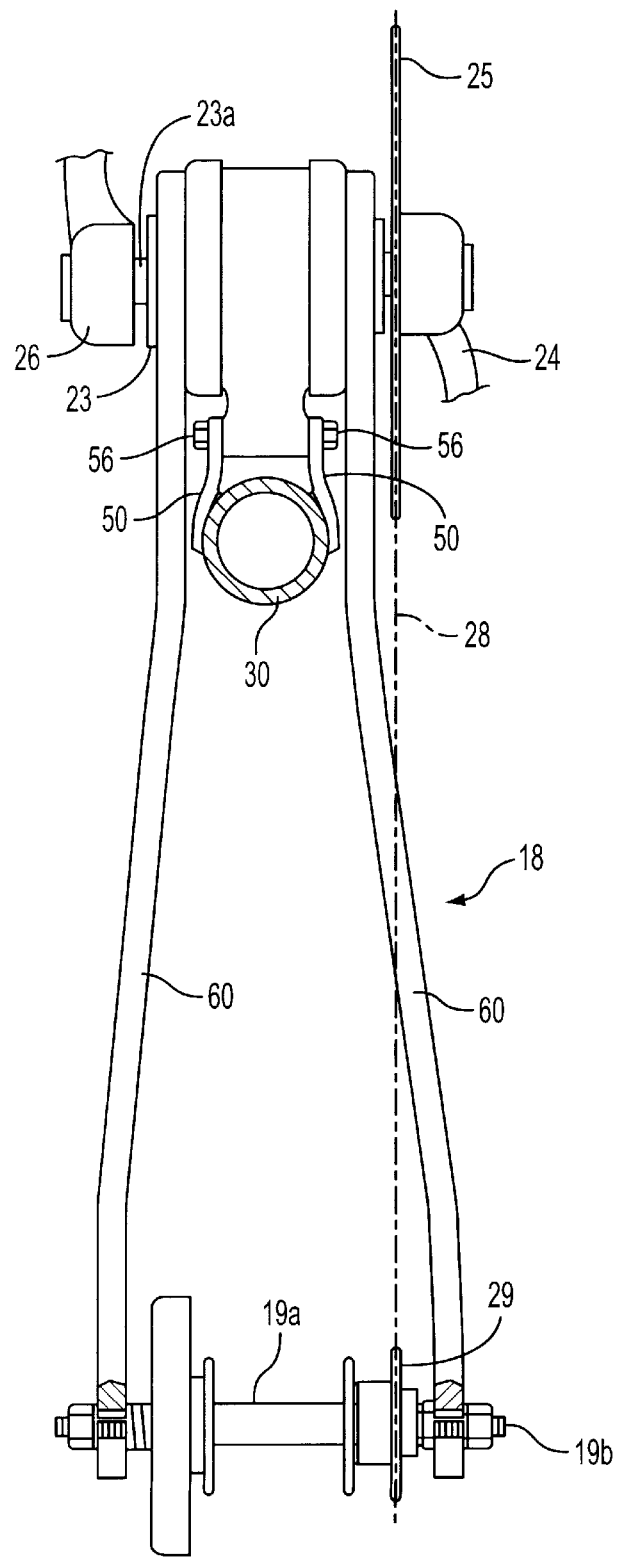
FIG. 3 is a top view of the driving parts of the bicycle shown in FIG. 1.

The bicycle 10 further comprises a rear wheel 19, which is mounted on the rear part of the frame 12 while allowed to rotate about a rear hub 19*a*; a front wheel 20, which is linked to the front part of the frame 12 while allowed to rotate about a front hub 20*a*; and a drive part 22 for propelling the bicycle. As shown in FIG. 3, the drive part 22 has the same structure as in the past; that is, it comprises a bottom bracket 23 (FIG. 4) having a bottom bracket axle 23*a*, a right crank 24 equipped with a front sprocket 25 and nonrotatably mounted on the right end of the bottom bracket axle 23*a*, a left crank 26 nonrotatably mounted on the left end of the bottom bracket axle 23*a*, a rear sprocket 29 mounted on the rear hub 19*a*, and a drive chain 28 passed over the two sprockets 25 and 29. A pedal 27 is mounted on the tip of either crank 24 and 26.

The main frame member 16 is composed of a plurality of rigid tubular members welded together. Specifically, the main frame member 16 has a seat tube 30, a head tube 32, an upper tube 33 for linking the two tubes 30 and 32, and a down tube 34. The main frame member 16 should preferably be manufactured using a rigid material such as a high-strength steel, chromium-molybdenum steel, aluminum alloy, titanium alloy, or other metal material; or a carbon composite or other such fiber-reinforced resin material. A seat post 38, with a saddle 37 mounted in the distal end thereof, is fixed to the seat tube 30 such that the vertical position thereof can be adjusted. A front fork 40 is rotatably mounted in the head tube 32. The front wheel 20 is rotatably mounted in the lower end of the front fork 40, and a steering handle assembly 42 is mounted on the upper end thereof such that the vertical position thereof can be adjusted.

A pair of brackets 50 for mounting the suspension assembly 14 are fixedly welded to the linkage portion of the down tube 34 and the seat tube 30. As shown in FIGS. 2 and 3, the brackets 50 have a first fixing part 50*a*, which is fixedly welded to the down tube 34; a second fixing part 50*b*, which is fixedly welded to the seat tube 30 diagonally underneath the first fixing part 50*a*; and a link 50*c*, which is bent into a quarter-circle segment and which links the two fixing parts 50*a* and 50*b*. Such brackets 50 allow the main frame member 16 to be reinforced by mounting the suspension assembly 14 and linking the down tube 34 and the seat tube 30. In addition, the main frame member 16 can be reinforced by linking the two tubes 34 and 30 with the aid of the suspension assembly 14 when the suspension assembly 14 is mounted separately on the tubes 34 and 30 without the use of the link 50*c*.

The suspension assembly 14 is mounted between the two brackets 50 and is fixed with bolts 56. Each of the brackets 50 is provided with two bolt holes (not shown) for receiving the bolts 56 therethrough. The dismounting of the suspension assembly 14 or the rear frame member 18 is thus facilitated by the detachable mounting of the suspension assembly 14 on the main frame member 16 with the bolts 56.

Figure 4:
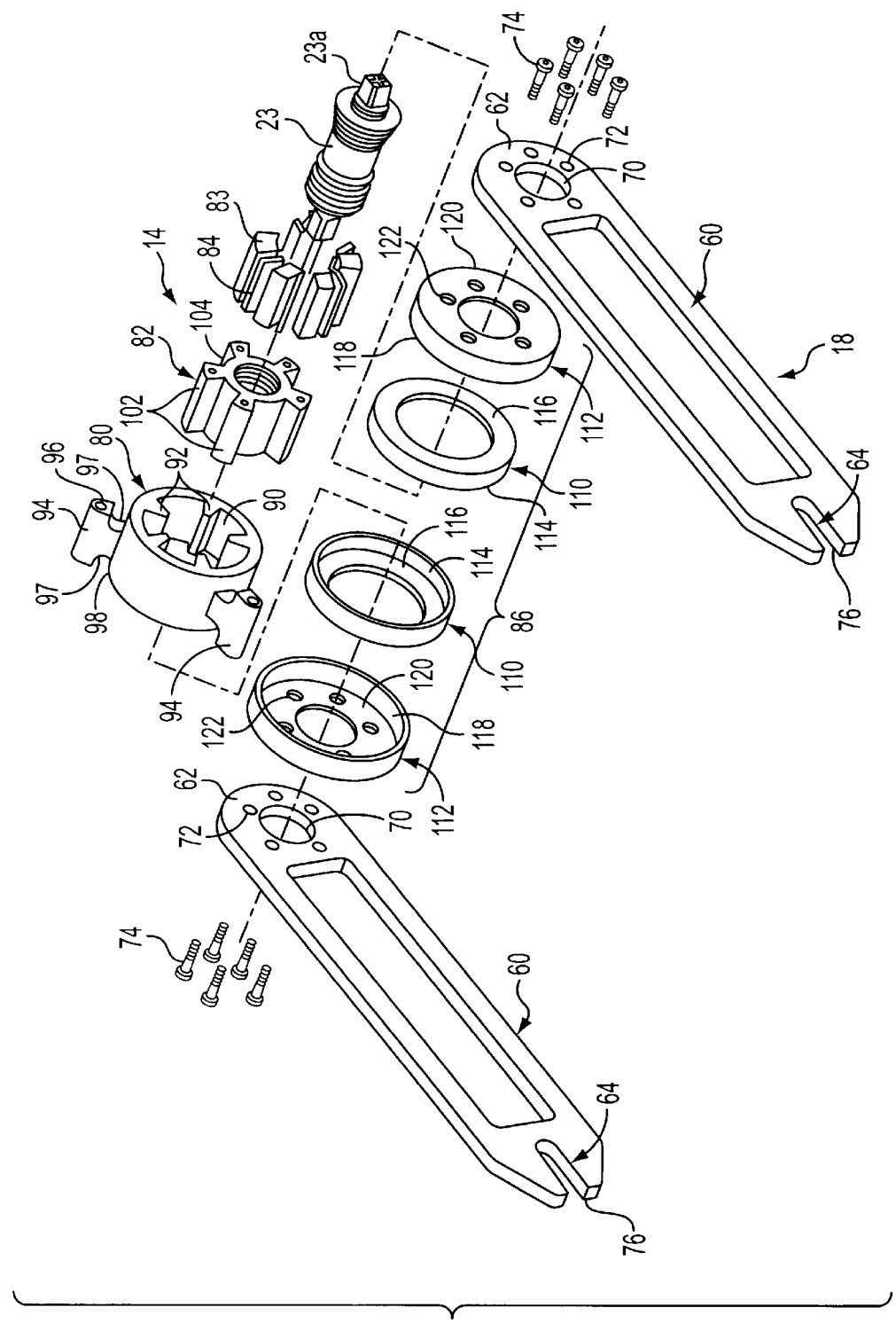
FIG. 4 is an exploded view of a particular embodiment of a shock absorber according to the present invention.

The rear frame member 18 has a pair of substantially identical arm members 60, as shown in FIG. 4. Each arm member 60 has a circular suspension-mounting part 62 at the base end and a hub-mounting part 64 at the distal end. The suspension-mounting part 62 is fixed in the internal member (see below) of the suspension assembly 14. The rear hub 19*a* is mounted between the two hub-mounting parts 64, and a hub axle 19*b* is fixed in the hub-mounting parts 64.

The suspension-mounting parts 62 have central holes 70 for accommodating the bottom bracket 23, and five bolt holes 72 for mounting bolts 74 are provided around each central hole 70. The bolts 74 are used to fix the suspension-mounting parts 62 to the internal member of the suspension assembly 14. The hub-mounting parts 64 are provided with slits 76 that extend in the longitudinal direction of the arm members 60, and the hub axle 19*b* of the rear hub 19*a* is fixed in these slits 76 by a known method.

Figure 5:
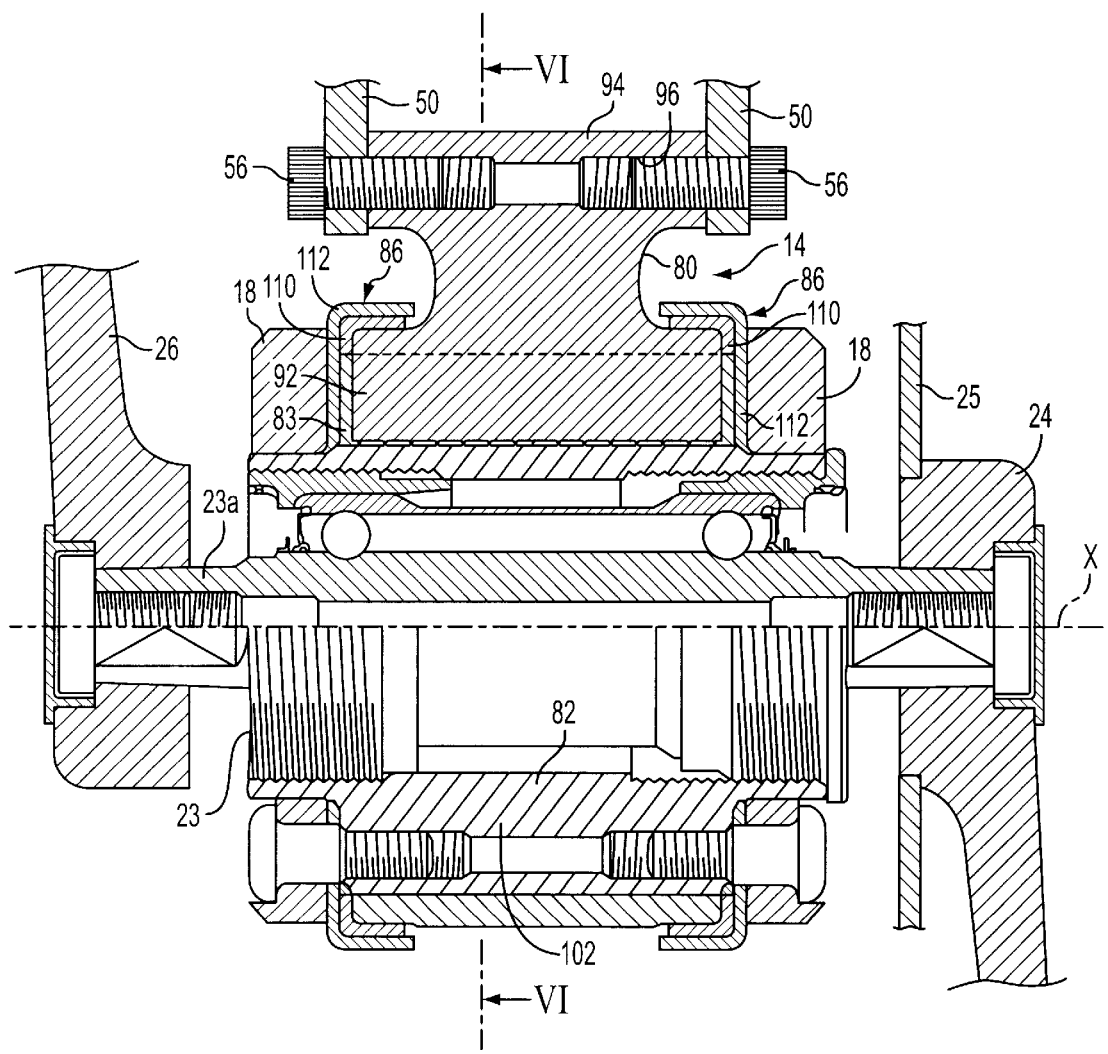
FIG. 5 is a cross-sectional view of the assembled bicycle shock absorber shown in FIG. 4.
Figure 6:
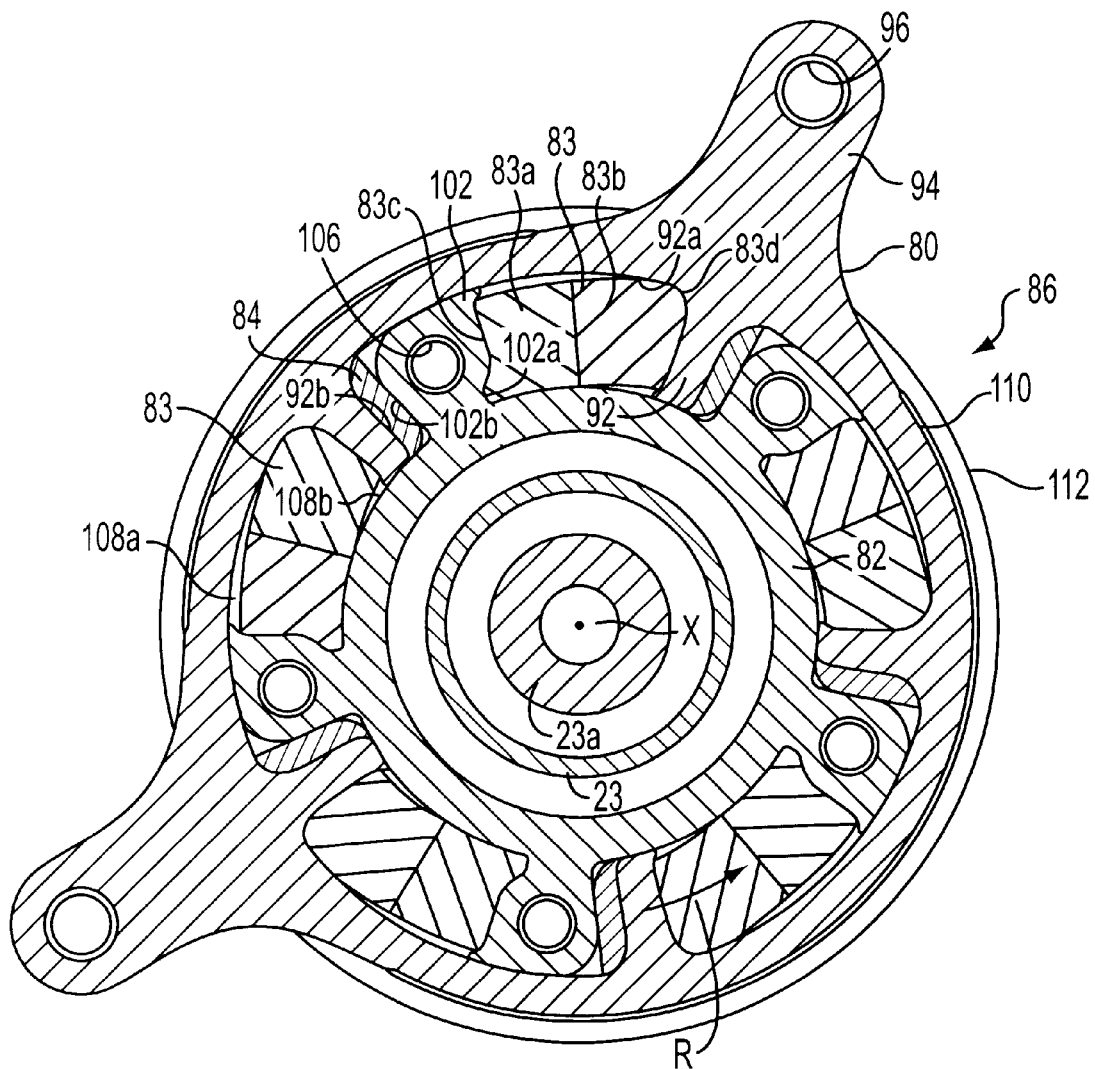
FIG. 6 is a view taken along line VI—VI in FIG. 5.

As shown in FIGS. 4–6, the suspension assembly 14 comprises an external member (first member) 80 fixed to the main frame member 16; an internal member (second member) 82 disposed around the inside of the external member 80 and fixed to the rear frame member 18; first and second elastic members 83 and 84, which are expanded and contracted by the relative rotation of the external member 80 and internal member 82; in a rotational direction R around a rotational axis X and a link mechanism 86 for concentrically positioning the external member 80 and internal member 82 and linking the two members 80 and 82 in a relatively rotatable and axially immovable fashion.

The external member 80 is a substantially cylindrical member that is made of metal and that has in its interior a circular opening 90 centered around a central axis extending to the right and left of the bicycle 10. Aluminum alloys, titanium alloys, chromium-molybdenum steel, high-strength steel, stainless-steel alloys, and the like are preferred as the metals for use in these. The internal member 82 can be accommodated together with the bottom bracket 23 and the two elastic members 83 and 84 in the opening 90. The opening 90 is formed such that its central axis coincides with the central axis of the bottom bracket 23 (axial center of the bottom bracket axle 23*a*), and it is provided with five first protrusions 92 extending radially inward. As shown in FIG. 6, circularly beveled first retaining parts 92*a* are provided along the border between the outer circumferential surface of the external member 80 and the circumferential side of the base ends (roots) of the first protrusions 92.

Two mounting parts 94 extending radially outward are provided around the outside of the external member 80. The distal ends of each mounting part 94 are provided with screw holes 96 extending to a prescribed depth from both ends. These screw holes 96 are formed at positions that face the bolt holes of the brackets 50, and the suspension assembly 14 is mounted on the main frame member 16 by screwing the bolts 56 passing through the bolt holes of the brackets 50 into these screw holes 96. The base end of each mounting part 94 is provided with notches 97 cut out at both ends, and circular surfaces 98 are formed on the outer circumferential surfaces at the two ends of the external member 80.

The internal member 82 is a substantially cylindrical member made of metal and provided with a through hole 104 for the internal mounting of the bottom bracket 23 by a mounting technique based on the use of known screws. Aluminum alloys, titanium alloys, chromium-molybdenum steel, high-strength steel, stainless-steel alloys, and the like are preferred as the metals for use in these. Five second protrusions 102 extending radially outward are formed on the outer circumferential part of the internal member 82. The second protrusions 102 are disposed alternately with the first protrusions 92. As a result, it is possible to form two types of substantially rectangular spaces whose volume is varied by the relative rotation of the external member 80 and internal member 82 between the first protrusions 92 and the second protrusions 102. Of these, the first elastic members 83 are mounted in the wider spaces, and the second elastic members 84 are mounted in the narrower spaces. Circularly beveled second retaining parts 102*a* are provided along the border between the outer circumferential surface of the internal member 82 and the circumferential side of the base ends of the second protrusions 102.

The other circumferential surfaces 92b of the first protrusions 92 and the other circumferential surfaces 102b of the second protrusions 102 face each other in a substantially parallel fashion in a state in which the two elastic members 83 and 84 are mounted. Screw holes 106 for screwing in the bolts 74 are formed on the tip side of the second protrusions 102. The rear frame member 18 is fixed to the suspension assembly 14 and elastically linked to the main frame member 16 by screwing the bolts 74 into these screw holes 106 through the bolt holes 72 of the arm members 60.

In this embodiment, the first elastic members 83 are members manufactured from bar-shaped elastic bodies and provided with a deformed rectangular shape in cross section. The first elastic members 83 have first elastic bodies 83a, and second elastic bodies 83b that are lined up with the first elastic bodies 83a in the rotation direction and possess lower elasticity than do the first elastic bodies 83a. The two elastic bodies 83a and 83b may, for example, be immovably fixed by bonding with an adhesive. Urethane rubber, nitrile rubber, polyethylene elastomer, or the like can be used for such elastic bodies. In the first elastic members 83, the angular portions 83c on the outer circumferential side in contact with the first protrusions 92 are rounded in the form of acute angles, as are the angular portions 83d on the inner circumferential side in contact with the second protrusions 102. The first elastic members 83 are mounted while pressure is applied to one of the spaces formed by the first protrusions 92 and second protrusions 102, and both ends thereof are brought into contact with a second bushing 112. The angular portions 83c of the second elastic bodies 83b are held by the first retaining parts 92a around the outside in areas of contact with the first protrusions 92, whereas the angular portions 83d of the first elastic members 83a are held by the second retaining parts 102a, which are disposed along the inner circumference diagonally from the first retaining parts 92a, in areas of contact with the second protrusions 102. The first elastic members 83, to which the two elastic bodies 83a and 83b are immovably fixed, are thus held by the corresponding diagonally arranged retaining parts 92a and 102a, thus making it more difficult for the first elastic members 83 to slip in a manner other than that involving expansion in the thickness direction (direction that intersects the direction of contraction) as a result of a contraction occurring when the first elastic members 83 are compressed and deformed. The shock absorption performance can therefore be stabilized.

The first elastic members 83 are mounted in a secured state in one of the spaces while gaps 108a are formed near the inner circumferential surface of the external member 80. These gaps gradually become narrower in the clockwise direction away from the area of contact with the second protrusions 102. With such mounting, gaps 108b are also formed near the outer circumferential surface of the internal member 82. These gaps gradually become narrower in the counterclockwise direction away from the area of contact with the first protrusions 92. Because the first elastic members 83 are disposed such that the gradually narrowing gaps 108a and 108b are formed, the first elastic members 83, when gradually sandwiched and contracted between the protrusions 92a and 102a, can swell in the direction that intersects the contraction direction, making it possible to increase the amount of rotation for the members 80 and 82 and to ensure adequate shock absorption.

When the internal member 82 performs relative rotation, and the first elastic members 83 first contract and then expand into the gaps 108a and 108b, the first elastic members 83 gradually adhere to the inner circumferential surface of the external member 80 and to the outer circumferential surface of the internal member 82, lowering the amount of slippage in the area where adhesion-induced friction occurs, reducing the likelihood that the first elastic members 83 will be worn down, and making it possible to inhibit wear-induced variations in the shock absorption performance. In addition, gradual compression proceeds from the first elastic bodies 83a, which have high elasticity, when the internal member 82 performs relative rotation and the first elastic members 83 are compressed, and the compression of the second elastic bodies 83b begins when the first elastic bodies 83a have been compressed to a certain degree. It is therefore possible for the suspension characteristics to be changed from a soft state to a hard state in the course of a stroke (during compression). More specifically, mild shocks created by fine irregularities are absorbed by the first elastic bodies 83a, whereas violent shocks created by large differences in grade or the like can be absorbed by the second elastic bodies 83b. Various shocks received from the road surface can therefore be easily softened.

In this embodiment, the second elastic members 84 are made of substantially plate-shaped elastic bodies mounted for the purpose of applying pressure to the first elastic members 83 and inhibiting the collision noise resulting from contact between the two protrusions 92 and 102. Urethane rubber, nitrile rubber, polyethylene elastomer, and the like are preferred for use in such elastic bodies. The other circumferential surfaces 92b of the first protrusions 92 and the other circumferential surfaces 102b of the second protrusions 102 face each other in a substantially parallel fashion in a state in which pressure is exerted by the second elastic members 84 on the first elastic members 83. Consequently, the gaps between the other circumferential surfaces 92b of the first protrusions 92 and the other circumferential surfaces 102b of the second protrusions 102 remain unchanged, and the pressure applied to the first elastic members 83 is less likely to vary when the second elastic members 84 slip in the radial direction. Here, applying pressure to the first elastic members 83 suppresses the movement of the suspension assembly 14 under the weight of the rider when the latter mounts the bicycle.

The link mechanism 86 has a first bushing 110 made of a synthetic resin and fixed to the external member 80, and a second bushing 112 made of metal, disposed around the outside of the first bushing 110, and fixed to the internal member 82. Polyacetal resins, nylon, Teflon (registered trade name), and other synthetic resins are preferred for use as the synthetic resins for the first bushing 110. Iron-based metals, copper, brass-based alloys, and other metals are preferred for use as the metals for the second bushing 112. The first bushing 110 is a flanged annular member having a first cylindrical part 114 in contact with the circular surfaces 98 of the external member 80 and a first annular part 116 folded away from the first cylindrical part 114 and kept in contact with the end face of the external member 80. The first bushing 110 is fixed by being fitted over the circular surfaces 98 of the external member 80.

The second bushing 112 is a flanged annular member having a second cylindrical part 118 in contact with the first cylindrical part 114 of the first bushing 110 and a second annular part 120 folded away from the second cylindrical part 118 and kept in contact with the first annular part 116 of the first bushing 110. Five bolt holes 122 are formed in the second annular part 120 at positions facing the five bolt holes 72. The second bushing 112 is fixed by the bolts 74 to the internal member 82 together with the rear frame member 18.

Figure 8:
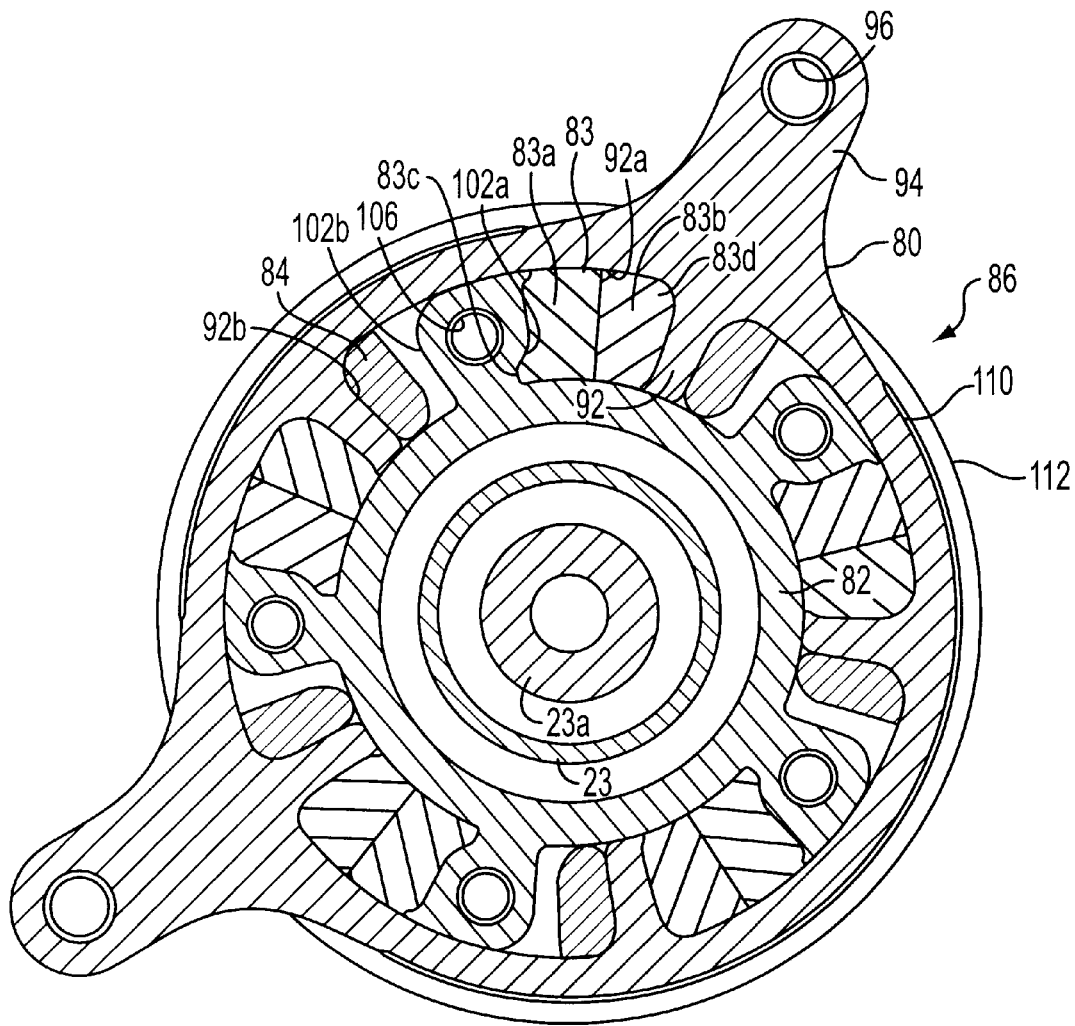
FIG. 8 is a cross-sectional view of the bicycle shock absorber at the end of a shock absorbing stroke.

The shock-absorbing operation of the suspension assembly 14 will now be described. When a shock or load created by road irregularities or differences in level acts on the rear wheel 19, the rear frame member 18 rotates clockwise together with the internal member 82 about the bottom bracket axle 23a in FIG. 1. Such rotation about the bottom bracket axle 23a prevents the drive chain 28 from being stretched, loosened, or otherwise adversely affected in the manner encountered when rotation is induced in other areas. Pedaling loss and the like can therefore be suppressed. During the application of a shock or load to the bicycle, the first elastic members 83 are deformed by being compressed between the two protrusions 92 and 102, absorbing this shock or load. At this time, the gaps 108a and 108b between the first elastic members 83 and the external member 80 (and internal member 82) gradually become narrower, and if such compression continues until the gaps disappear (as shown in FIG. 8), the entire contact surface restricts the movement of the first elastic members 83, completing the stroke.

Figure 7:
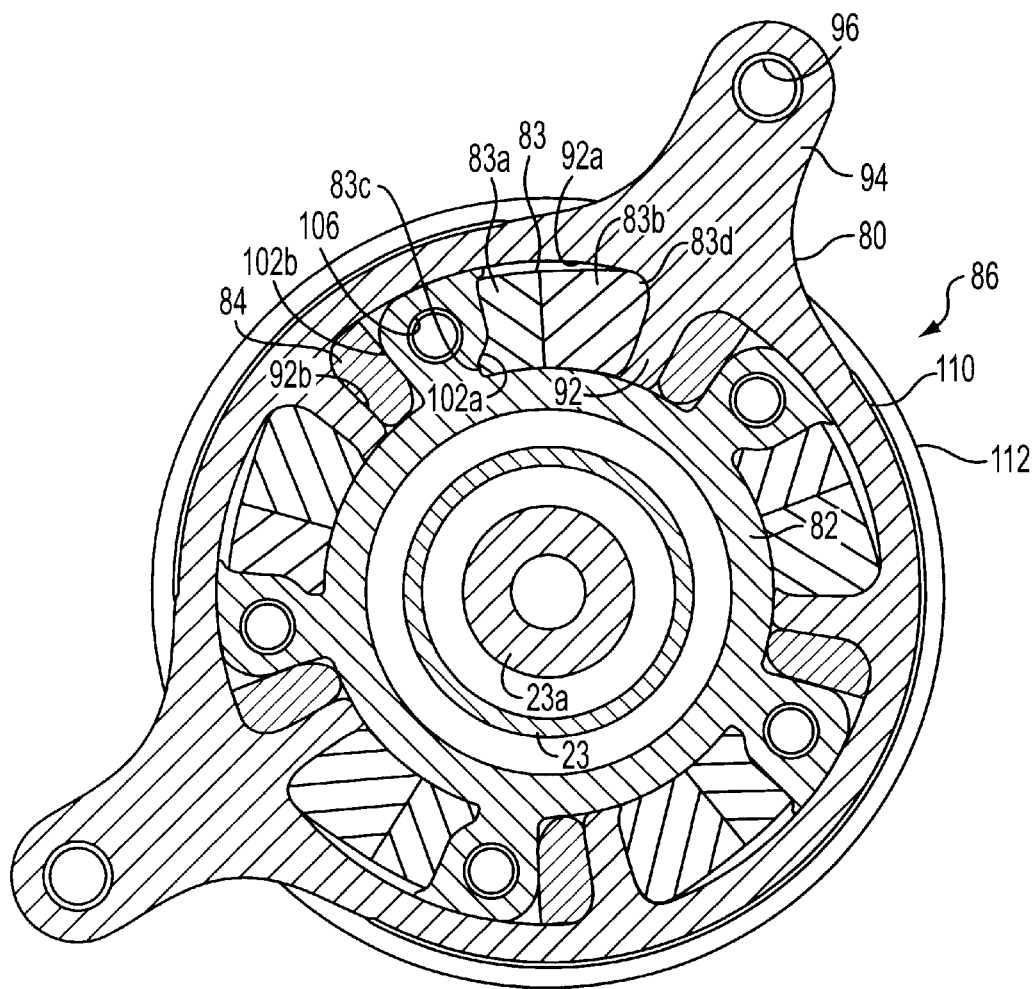
FIG. 7 is a cross-sectional view of the bicycle shock absorber in a middle of a shock absorbing stroke.
Figure 9:
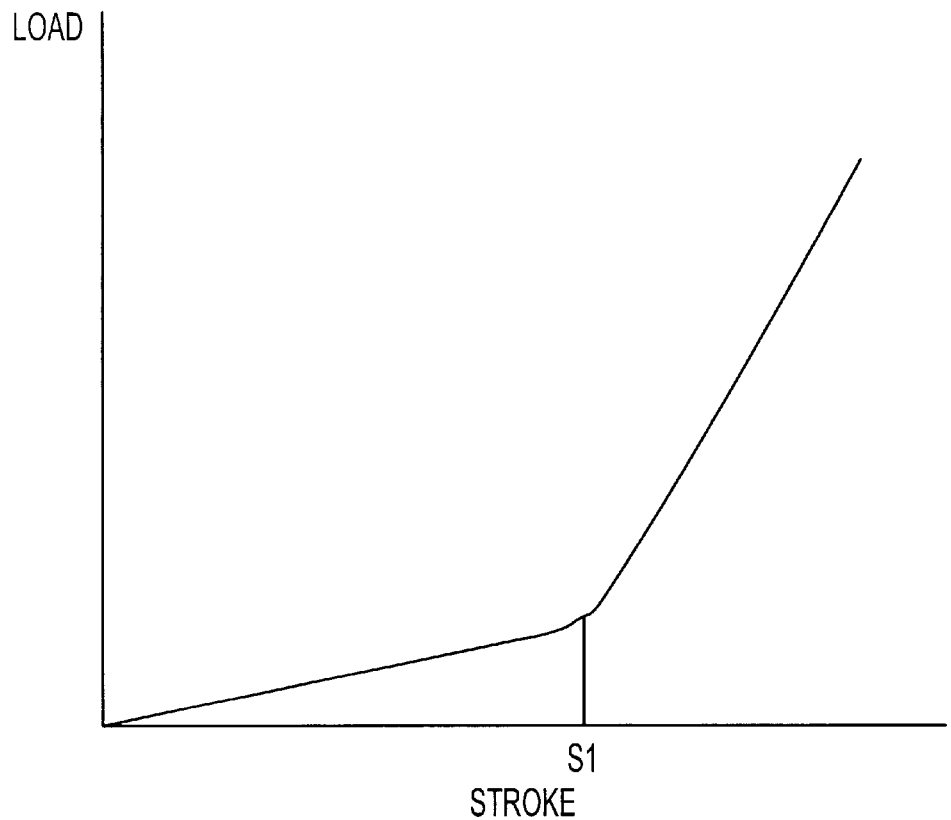
FIG. 9 is a graph illustrating the shock absorbing characteristics of the shock absorber shown in FIGS. 6–9.

Releasing the shock or load causes the first elastic members 83 to be expanded by elastic restoring force and returns the internal member 82 to its initial position. The corresponding relation between the load and the stroke of the internal member 82 is depicted in FIG. 9. In the first half of the stroke, the first elastic bodies 83a, which are soft and have high elasticity, are compressed, absorbing the shocks. At this time, the incline of the load in relation to the stroke becomes more gentle, and soft suspension characteristics are afforded, making it possible to absorb fine irregularities. When a violent shock is then applied, the compression of the second elastic bodies 83b starts the moment (stroke S1) when the first elastic bodies 83a reach a certain degree of compression. This state is shown in FIG. 7. The second elastic bodies 83b, which are hard and have low elasticity, begin compressing and absorb shocks during the second half of the stroke (subsequent to this stroke S1), increasing the slope of the load in relation to the stroke, yielding hard suspension characteristics, and making it possible to absorb violent shocks without creating bottom impacts. In addition, gaps 108a and 108b are formed between the first elastic members 83 and the external member 80 (and internal member 82), thus facilitating the expansion of the first elastic members 83 and making it possible to obtain a large stroke in relation to the load (as shown by the bold line in FIG. 8) and widening the shock-absorbing range. The stroke decreases in relation to the load (as shown by the thin line in FIG. 8) in the absence of the gaps 108a or 108b.

Radial movement of the first elastic members 83 during compression is inhibited because the first elastic members 83 are held at two locations in the diagonal direction of bite during compression and because the two elastic bodies 83a and 83b are immovably fixed. Consequently, the shock absorption characteristics depicted in FIG. 9 always vary in a uniform manner, yielding a stable shock absorption performance. Furthermore, radial slippage of the external member 80 and the internal member 82 is inhibited because the two members 80 and 82 are linked by the link mechanism 86 in a relatively rotatable and axially immovable fashion. Consequently, contact between the members 80 and 82 during impact can be prevented, and the two members 80 and 82 are less likely to be damaged when a shock is applied.

Figure 10:
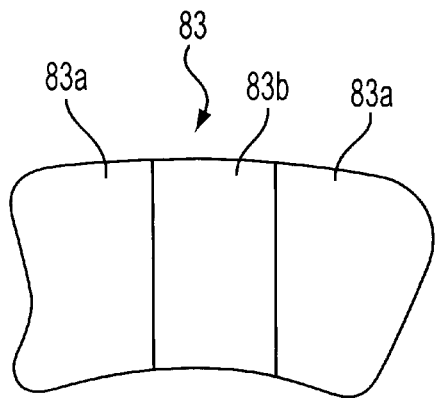
FIG. 10 is a side view of an alternative embodiment of an elastic member used in the shock absorber shown in FIG. 5.

While the above is a description of various embodiments of the present invention, further modifications may be employed without departing from the spirit and scope of the present invention. For example, although in the above-described embodiment the first elastic members 83 were composed of first and second elastic bodies 83a and 83b, it is also possible, for example, to dispose the first elastic bodies 83a on both sides of the second elastic bodies 83b, as shown in FIG. 10. In this case, only one of the two first elastic bodies 83a, 83a is first compressed when the impact velocity is high, and both first elastic bodies 83a, 83a are compressed when the velocity is low. The suspension characteristics therefore vary with the impact velocity, making it possible to neutralize various shocks.

Figure 11:
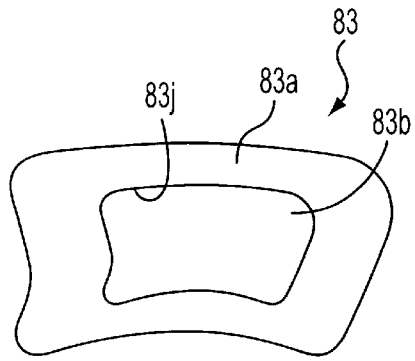
FIG. 11 is a side view of another alternative embodiment of an elastic member used in the shock absorber shown in FIG. 5.

Although in the above-described embodiment all the elastic bodies were lined up, it is also possible to line up only some of these elastic bodies. In FIG. 11, a storage space 83j is formed in the central part of a first elastic body 83a, and a second elastic body 83b is housed in this storage space 83j. In this case, the first elastic bodies 83a and second elastic bodies 83b are lined up not only in the rotation direction but also in the radial direction that intersects this rotation direction, thus making it possible to reduce the abrupt changes in elasticity occurring during compression and suppressing sudden changes in the suspension characteristics. In addition, the second elastic bodies 83b may be immovably held by the first elastic bodies 83a even when the two elastic bodies 83a and 83b are not fixed by means of an adhesive or other fixing means.

Figure 12:
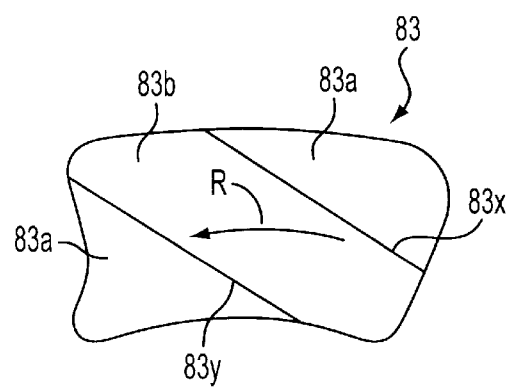
FIG. 12 is a side view of another alternative embodiment of an elastic member used in the shock absorber shown in FIG. 5.

Although in the above-described embodiment the elastic bodies 83a and 83b were lined up such that borderlines were formed in the direction that intersected the rotation direction, it is also possible to line the elastic bodies 83a and 83b such that the borderlines 83x and 83y are formed at an incline, to the rotational direction R as shown in FIG. 12. In this case, the overall elasticity varies with the extent of the incline, thus making it easier to neutralize various shocks.

Figure 13:
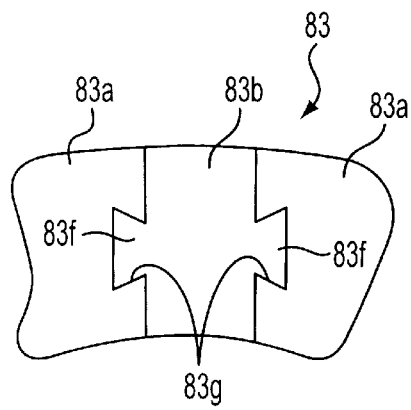
FIG. 13 is a side view of another alternative embodiment of an elastic member used in the shock absorber shown in FIG. 5.
Figure 14:
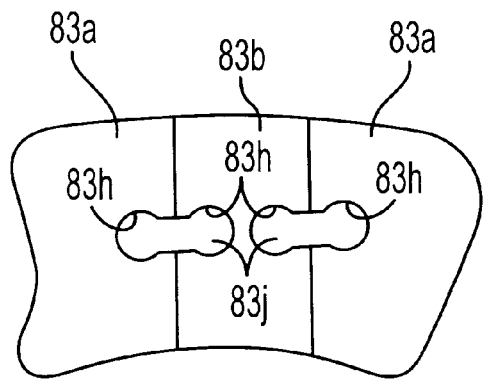
FIG. 14 is a side view of another alternative embodiment of an elastic member used in the shock absorber shown in FIG. 5.

Although in the above-described embodiment the elastic bodies 83a and 83b were immovably fixed with an adhesive, it is also possible for the elastic bodies 83a and 83b to be fixed through locking in place, as shown in FIGS. 13 and 14. In FIG. 13, the elastic body 83b is provided with protrusions 83f, and the elastic body 83a is provided with a dovetail groove 83g, which is locked in place by the protrusions 83f. In FIG. 14, the elastic bodies 83a and 83b are provided with round grooves 83h, and dumbbell-shaped securing elements 83i are mounted in these round grooves 83h. Such a securing structure is not limited to the two above-described embodiments alone and includes all other structures capable of fixedly securing a plurality of elastic bodies. In this case, the compression of one elastic body is unlikely to affect the compression of other elastic bodies because the elastic bodies 83a and 83b are fixed by being merely locked in place.

Figure 15:
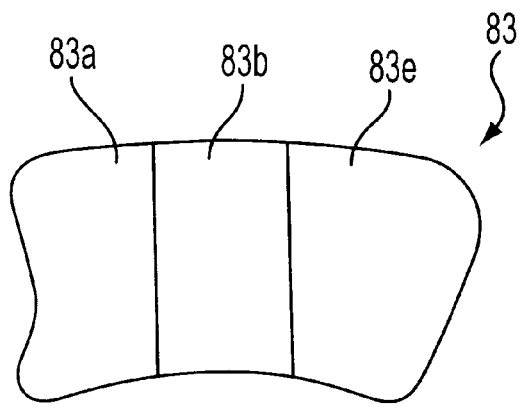
FIG. 15 is a side view of another alternative embodiment of an elastic member used in the shock absorber shown in FIG. 5.
Figure 16:
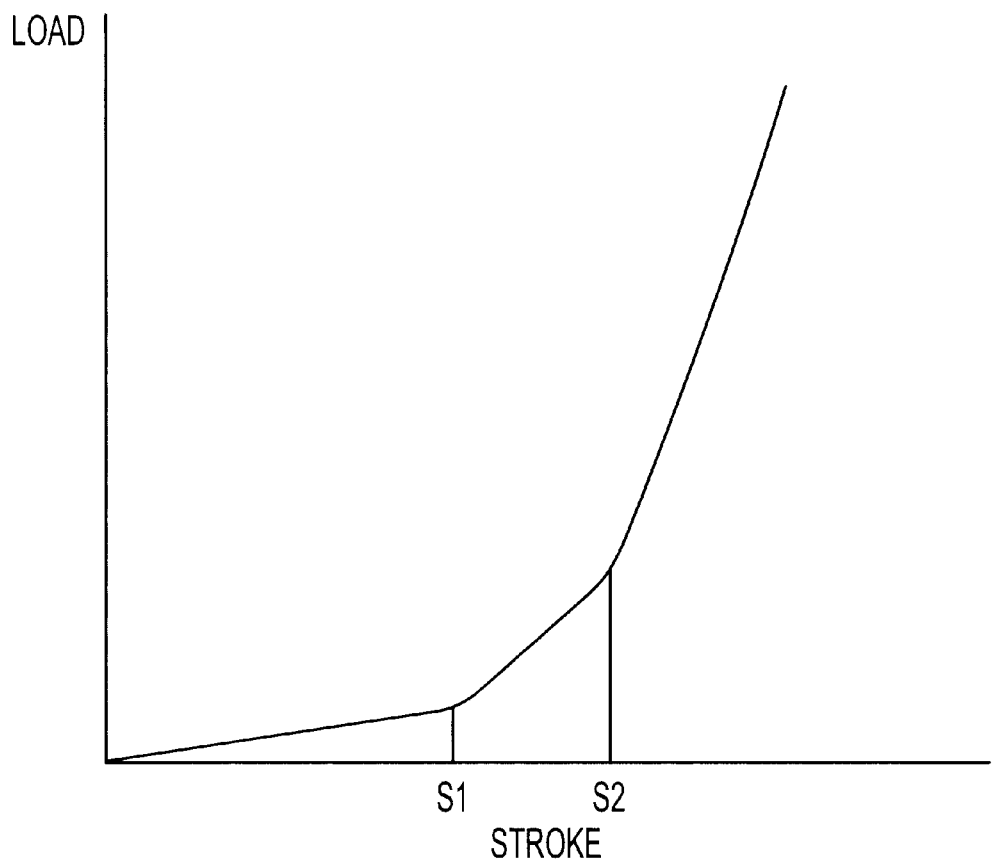
FIG. 16 is a graph illustrating the shock absorbing characteristics of a shock absorber using the elastic members shown in FIG. 15.

Although in the above-described embodiment the first elastic members 83 were composed of two elastic bodies 83a and 83b having different elasticities, it is also possible to compose the first elastic members 83 from three or more types of elastic bodies having different elasticities. In FIG. 15, a first elastic member 83 is composed of three types of elastic bodies 83a, 83b, and 83e, which are lined up in the rotation direction. Here, the elasticities of the first elastic body 83a, second elastic body 83b, and third elastic body 83e may, for example, gradually decrease in the order indicated. A first elastic member 83 thus configured softens the suspension characteristics and allows fine irregularities to be absorbed until the moment (stroke S1) when the first elastic body 83a reaches a certain degree of compression, as shown in FIG. 16. If a more violent shock is applied, the second elastic body 83b starts contracting and the suspension characteristics harden somewhat, making it possible to neutralize moderate shocks. If an even more violent shock is applied, the third elastic body 83e starts contracting the moment (stroke S2) when the second elastic body 83b reaches a certain degree of compression, and the suspension characteristics become even harder, making it possible to neutralize violent shocks. With this arrangement, an even greater variety of types of shocks can be softened.

Although the above-described embodiment involved mounting second elastic members 84 and applying pressure to the first elastic members 83, it is also possible to dispense with the mounting of the second elastic members 84. When the second elastic members 84 are mounted, it is also possible to mount elastic bodies that are sufficiently soft to prevent pressure from being applied to the first elastic members 83. Such second elastic members 84, while incapable of applying pressure, can still prevent noise from being generated by the impact between the protrusions 92 and 102, and make it possible to absorb shocks during a return to the original state.

Although in the above-described embodiment showed elastic bodies having the same elasticity were mounted in the five spaces formed by the two protrusions 92 and 102, it is also possible to mount a first elastic member and/or a second elastic member having different elasticity in at least one of the five spaces.

The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. In a shock absorber for mounting between a first frame member and a second frame member of a bicycle, wherein the shock absorber includes a first member adapted to couple to the first frame member, a second member adapted to couple to the second frame member, and a coupling mechanism coupling the first member with the second member so that the first member rotates relative to the second member around a rotational axis or an axle, a shock absorbing member for placement between the first member and the second member so that the shock absorbing member expands and contracts in response to relative rotation of the first member and the second member, wherein the shock absorbing member comprises:

a first elastic body adapted to be positioned between a first protrusion on said first member and a second protrusion on said second member;

a second elastic body at least partially overlapping the first elastic body when viewed in a rotational direction of the first member and the second member and adapted to be positioned adjacent to said first elastic body between said first elastic body and said first protrusion; and wherein an elasticity of the first elastic body is different from an elasticity of the second elastic body.

2. The shock absorbing member according to claim 1 wherein the first elastic body is immovably fixed to the second elastic body.

3. The shock absorbing member according to claim 2 wherein the first elastic body is bonded to the second elastic body.

4. The shock absorbing member according to claim 1 wherein a border between the first elastic body and the second elastic body is inclined in the rotational direction.

5. The shock absorbing member according to claim 1 further comprising a third elastic body at least partially overlapping the second elastic body in a rotational direction of the first member and the second member, wherein an elasticity of the third elastic body is different from the elasticity of the second elastic body.

6. The shock absorbing member according to claim 5 wherein the second elastic body is disposed between the first elastic body and the third elastic body.

7. The shock absorbing member according to claim 6 wherein an elasticity of the third elastic body is different from the elasticity of the first elastic body and the second elastic body.

8. The shock absorbing member according to claim 7 wherein the elasticity of the second elastic body is less that the elasticity of the first elastic body, and wherein the elasticity of the third elastic body is less than the elasticity of the second elastic body.

9. The shock absorbing member according to claim 5 wherein the first elastic body is immovably fixed to the second elastic body, and wherein the third elastic body is immovably fixed to the second elastic body.

10. The shock absorbing member according to claim 1 wherein the second elastic body is disposed in the first elastic body.

11. The shock absorbing member according to claim 10 wherein the first elastic body surrounds the second elastic body.

12. The shock absorbing member according to claim 1 wherein the second elastic body has a protrusion that engages a groove in the first elastic body.

13. A shock absorber for mounting between a first frame member and a second frame member of a bicycle, wherein the shock absorber comprises:

a first member adapted to couple to the first frame member;

a second member adapted to couple to the second frame member;

a coupling mechanism coupling the first member with the second member so that the first member rotates relative to the second member;

a shock absorbing member for placement between the first member and the second member so that the shock absorbing member expands and contracts in response to relative rotation of the first member and the second member, wherein the shock absorbing member includes:

a first elastic body adapted to be positioned between a first protrusion on said first member and a second protrusion on said second member;

a second elastic body at least partially overlapping the first elastic body when viewed in a rotational direction of the first member and the second member and substantially perpendicular to a rotational axis of an axle, said second elastic body adapted to be positioned adjacent to said first elastic body lined up with said first elastic body; and wherein an elasticity of the first elastic body is different from an elasticity of the second elastic body.

14. The shock absorbing member according to claim 13 wherein the first elastic body is immovably fixed to the second elastic body.

15. The shock absorbing member according to claim 14 wherein the first elastic body is bonded to the second elastic body.

16. The shock absorbing member according to claim 13 wherein a border between the first elastic body and the second elastic body is inclined in the rotational direction.

17. The shock absorbing member according to claim 13 further comprising a third elastic body at least partially overlapping the second elastic body in a rotational direction of the first member and the second member, wherein an elasticity of the third elastic body is different from the elasticity of the second elastic body.

18. The shock absorbing member according to claim 17 wherein the second elastic body is disposed between the first elastic body and the third elastic body.

19. The shock absorbing member according to claim 18 wherein an elasticity of the third elastic body is different from the elasticity of the first elastic body and the second elastic body.

20. The shock absorbing member according to claim 19 wherein the elasticity of the second elastic body is less that the elasticity of the first elastic body, and wherein the elasticity of the third elastic body is less than the elasticity of the second elastic body.

21. The shock absorbing member according to claim 17 wherein the first elastic body is immovably fixed to the second elastic body, and wherein the third elastic body is immovably fixed to the second elastic body.

22. The shock absorbing member according to claim 13 wherein the second elastic body is disposed in the first elastic body.

23. The shock absorbing member according to claim 22 wherein the first elastic body surrounds the second elastic body.

24. The shock absorbing member according to claim 13 wherein the second elastic body has a protrusion that engages a groove in the first elastic body.

* * * * *